(12) United States Patent　　(10) Patent No.: US 7,697,030 B2
Terada et al.　　(45) Date of Patent: Apr. 13, 2010

(54) CONTROL DEVICE AND METHOD

(75) Inventors: Tomoyuki Terada, Toyonaka (JP);
Masaru Sawada, Suita (JP); Naotaka Kishida, Sakai (JP); Ayumi Itoh, Ikoma-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1222 days.

(21) Appl. No.: 10/733,493

(22) Filed: Dec. 10, 2003

(65) Prior Publication Data
US 2005/0030376 A1　Feb. 10, 2005

(30) Foreign Application Priority Data
Aug. 6, 2003　(JP)　............................ P2003-287474

(51) Int. Cl.
*H04N 7/18*　(2006.01)
(52) U.S. Cl. ....................................... 348/152; 348/155
(58) Field of Classification Search .......... 348/143–161
See application file for complete search history.

(56) References Cited
U.S. PATENT DOCUMENTS
6,028,626 A * 2/2000 Aviv ........................... 348/152
6,968,294 B2 * 11/2005 Gutta et al. ................. 702/188

FOREIGN PATENT DOCUMENTS
JP　63-41000 (A)　2/1988
JP　2003-44965 A　2/2003
JP　2003-123162　4/2003

OTHER PUBLICATIONS
Notification of Reason(s) for Refusal dated Sep. 6, 2005, for counterpart Japanese Patent Application No. 2003-287474, with an English-translation thereof.

* cited by examiner

*Primary Examiner*—Nhon T Diep
(74) *Attorney, Agent, or Firm*—Sidley Austin LLP

(57) ABSTRACT

A monitor camera is provided with a control device which carries out a predetermined process in response to an input of a trigger signal. The control device has an arrangement in that continuous images are successively inputted from a camera unit thereto and in that a detection of a moving object is carried out by detecting a change in images in a moving-object detector. When no change in images is detected by the moving-object detector within a predetermined time after the input of a trigger signal from a detection sensor to a trigger signal input unit, the control device determines the trigger signal inputted to the trigger signal input unit as valid. Then, only when the valid trigger signal has been detected, an abnormality process is carried out. Consequently, it is possible to prevent the abnormality process from being performed upon erroneous detection of a normal state as an abnormal state.

28 Claims, 9 Drawing Sheets

CONTROL DEVICE AND METHOD

This application is based on application No. 2003-287474 filed on Aug. 6, 2003 in Japan, the contents of which are hereby incorporated by reference.

BACKGROUND OF THE INVENTION

1. Field of the Invention

The present invention relates to a control technique of carrying out a predetermined process in response to an input of a trigger signal.

2. Description of the Background Art

Conventionally, with respect to a detection device for detecting invasion into a monitoring area, a device which has, for example, an invasion detection sensor, a monitor camera and a speaker, and allows the monitor camera to capture and record images in the vicinity of the invasion position, as well as allowing the speaker to give a warning voice or the like, in response to a trigger signal generated by the detection sensor upon detection of any intruding object has been proposed (e.g., Japanese Patent Application Laid-Open No. 2003-44965). In the detection device of this type, when the invasion detection sensor has detected any intruding object, it is unconditionally determined that there is any abnormality, and predetermined operations (image capturing and recording operations, warning operations and the like) are carried out.

However, in the conventional device, when detected by the detection sensor, any object is determined as an abnormal object; therefore, for example, when a detection sensor is attached to a common entrance, door or the like, there is a problem in that a warning voice is given even to a normal passenger who is not a suspicious intruder.

SUMMARY OF THE INVENTION

The present invention is directed to a control device for acquiring continuous images from an image capturing unit to carry out a predetermined process in response to an input of a trigger signal.

In accordance with one aspect of the present invention, a control device comprises: a signal input unit receiving the trigger signal; a detector detecting a change in images by analyzing continuous images obtained from the image capturing unit; and a determining unit determining the trigger signal as a valid signal when no change is detected in images by the detector within a predetermined time from the input of the trigger signal to the signal input unit.

In accordance with this control device, when no change is detected in images by the detector within a predetermined time from the input of a trigger signal to the signal input unit, the trigger signal is determined as a valid signal; therefore, it is possible to prevent a predetermined process from being always carried out in response to the input of the trigger signal. Thus, it is possible to prevent the predetermined process for an abnormal state from being performed when a normal state is erroneously detected as an abnormal state.

Moreover, the present invention is also directed to a program product which can be read by a computer to which a trigger signal and continuous images are inputted.

In accordance with another aspect of the present invention, the program product comprises the following instructions of: detecting a change in images by analyzing continuous images that are inputted to the computer; and determining the inputted trigger signal as a valid signal when no change is detected in images within a predetermined time from the input of the trigger signal.

With this arrangement, the program contained in this program product is read out, and executed by a computer so that it is possible to prevent the computer from always carrying out a predetermined process in response to an input of a trigger signal.

Moreover, the present invention is also directed to a control method of carrying out a predetermined process in response to an input of a trigger signal.

In accordance with still another aspect of the present invention, the control method comprises the following steps of: inputting a trigger signal; inputting continuous images; detecting a change in images by analyzing the inputted continuous images; and determining the trigger signal as a valid signal when no change is detected in images within a predetermined time from the input of the trigger signal.

By carrying out this control method, it becomes possible to prevent a predetermined process from being always carried out in response to the input of the trigger signal.

As described above, an object of the present invention is to provide a technique capable of preventing a predetermined process for abnormal state from being performed when a normal state is erroneously detected as the abnormal state.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
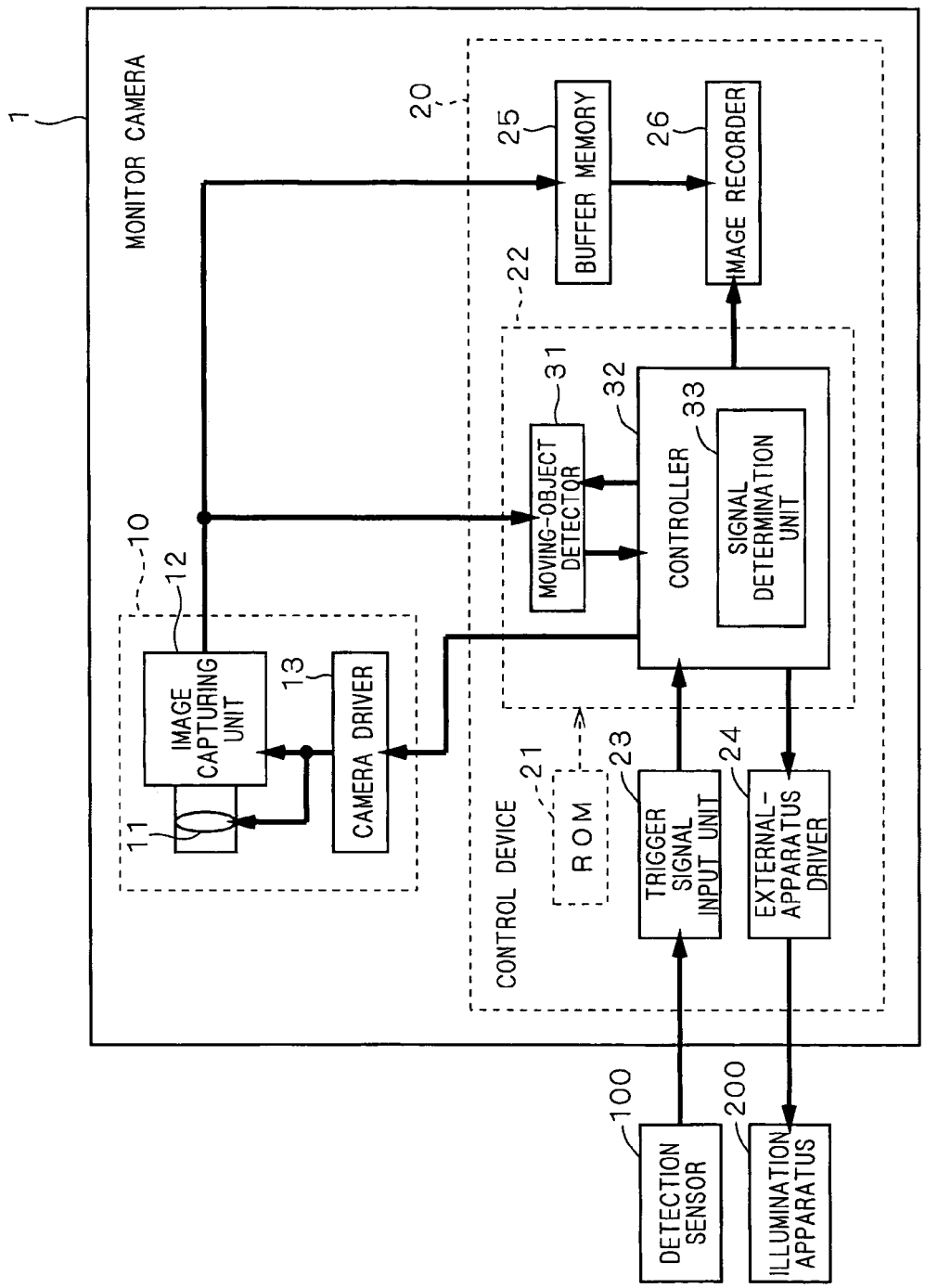
FIG. 1 shows a structure of a monitor camera in accordance with a first preferred embodiment.

Referring to the drawings, the following description will discuss preferred embodiments of the present invention in detail.

1. First Preferred Embodiment

FIG. 1 shows a structure of a monitor camera 1 in accordance with the first preferred embodiment. This monitor camera 1 is constituted by a camera unit 10 and a control device 20, with an external detection sensor 100 and an illumination apparatus 200 being connected thereto.

This detection sensor 100, which is used for detecting any intruding object into a predetermined monitoring area, generates a trigger signal upon detecting any intruding object or the like in the monitoring area. For example, when the detection sensor 100 is attached to a door at an entrance or the like as a door sensor, a magnet sensor or the like is utilized, and arranged so that, when the door is opened, an internal switch is turned on to generate the trigger signal.

The illumination apparatus 200 is illumination means that is placed so as to illuminate the monitoring area and give a warning to the intruder or the like, and its turning-on and off are carried out by controlling operations of the monitoring camera 1.

The camera unit 10 is constituted by a taking lens 11, an image capturing unit 12 and a camera driver 13. The taking lens 11 is provided with a zooming lens which can alter the image capturing magnification by changing the focal distance, and the image capturing magnification is adjusted by the camera driver 13. Moreover, the camera unit 10 has a pan/tilt mechanism, and this mechanism is driven by the camera driver 13 so that the image capturing direction of the image capturing unit 12 is changed to a panning direction and a tilting direction. The image capturing unit 12 photoelectrically converts a light image that is made incident thereon through the taking lens 11 to form an electronic image, and when the image capturing operation is started, continuously captures images and successively outputs images of, for example, several tens of frames per one second.

The control device 20 is provided with a ROM (Read Only Memory) 21, a microcomputer 22, a trigger signal input unit 23, an external-apparatus driver 24, a buffer memory 25 and an image recorder 26, and carries out an operation controlling process on the camera unit 10 as well as carrying out a predetermined process in response to a trigger signal inputted from the detection sensor 100. The ROM 21 stores a program executed by the microcomputer 22. The microcomputer 22 reads and executes the program so that the microcomputer 22 functions as a moving-object detector 31 and a controller 32.

When the camera unit 10 starts an image capturing operation, the moving-object detector 31 successively receives continuous images, and determines whether or not any moving object exists in each of the images in an image string that continues in time series. Upon detection of any moving object, the moving-object detector 31 gives the resulting information to the controller 32.

With respect to the method for the moving-object detection, many conventional techniques have been known, and any of these techniques may be adopted. For example, a differential image is formed by finding a differential value for each pixel between two images that are inputted in time series, and when the differential image contains pixels having differential values of not less than a predetermined value which exceed a predetermined threshold value, it is determined that any moving object exists therein.

The controller 32 controls the camera unit 10 and the image recorder 26, and has a function of allowing the moving-object detector 31 to start a moving-object detection process. Moreover, the controller 32 also functions as a signal determination unit 33. The signal determination unit 33 determines whether a trigger signal, inputted from the detection sensor 100 through the trigger signal input unit 23, is a valid signal or an invalid signal, and upon receipt of a signal indicating the detection of any moving object from the moving-object detector 31, it determines that the trigger signal inputted from the detection sensor 100 is valid.

A buffer memory 25 successively receives continuous images outputted from the camera unit 10, and stores the continuous images (movie images) lasting for approximately past several seconds. For example, the buffer memory 25 is prepared as a ring buffer, and upon receipt of a new image, the oldest image is erased at this time so that images corresponding to the latest several frames are always stored therein.

The image recorder 26 is used for recording the continuous images stored in the buffer memory 25 upon receipt of an instruction from the controller 32, and constituted by a semiconductor memory (such as RAM and EEPROM) that has a storing capacity greater than the buffer memory 25.

The trigger signal input unit 23, which is connected to the detection sensor 100, receives a trigger signal from the detection sensor 100, and gives the trigger signal to the controller 32. Moreover, the external-apparatus driver 24 has a switching function with a relay or the like, and carries out turning-on and -off operations on the illumination apparatus 200 in response to an external-apparatus activating signal from the controller 32.

In the monitor camera 1 having the above-mentioned arrangement, the control device 20 is maintained at a stand-by state until the detection sensor 100 has inputted a trigger signal thereto. For this reason, the camera unit 10 is also maintained at a stand-by state without executing any image capturing operation. Therefore, the monitor camera 1 is operated in a power saving mode with less power consumption until the trigger signal has been inputted from the detection sensor 100.

When the detection sensor 100 has detected any intruding object or the like in the monitoring area (for example, when the door is opened), the trigger signal is inputted to the controller 32 through the trigger signal input unit 23, thereby activating the entire monitor camera 1. The controller 32 sends a driving signal to the camera unit 10 to control the camera unit 10 to start an image capturing operation within a predetermined image capturing range. Thus, the camera unit 10 starts continuous image capturing operations, while executing panning/tilting/zooming operations so as to capture images of, for example, the monitoring area of the detection sensor 100 or the peripheral area thereof, and also starts to output the continuous images.

In response to these operations, the moving-object detector 31 functions in such a manner that the moving-object detector 31 analyzes the continuous images inputted from the camera unit 10, and when any moving object is detected in images within the image capturing area, obtained from the camera unit 10, informs the controller 32 of this fact.

Upon receipt of the information indicating the detection of any moving object from the moving-object detector 31, a signal determination unit 33 in the controller 32 is allowed to function so as to determine whether the trigger signal inputted thereto through the trigger signal input unit 23 is a valid signal or an invalid signal. The controller 32 has a timer function so that the signal determination unit 33 determines whether the trigger signal is valid or invalid, by determining whether any moving object is detected within a predetermined period from the input of the trigger signal with use of this timer function. When the trigger signal is valid, based upon the assumption that the object detected by the detection sensor 100 is an abnormal object, the controller 32 executes a process for generating a warning signal, while, when the trigger signal is invalid, based upon the assumption that the object detected by the detection sensor 100 is not an abnormal object, it does not execute the process for generating a warning signal.

Figure 2:
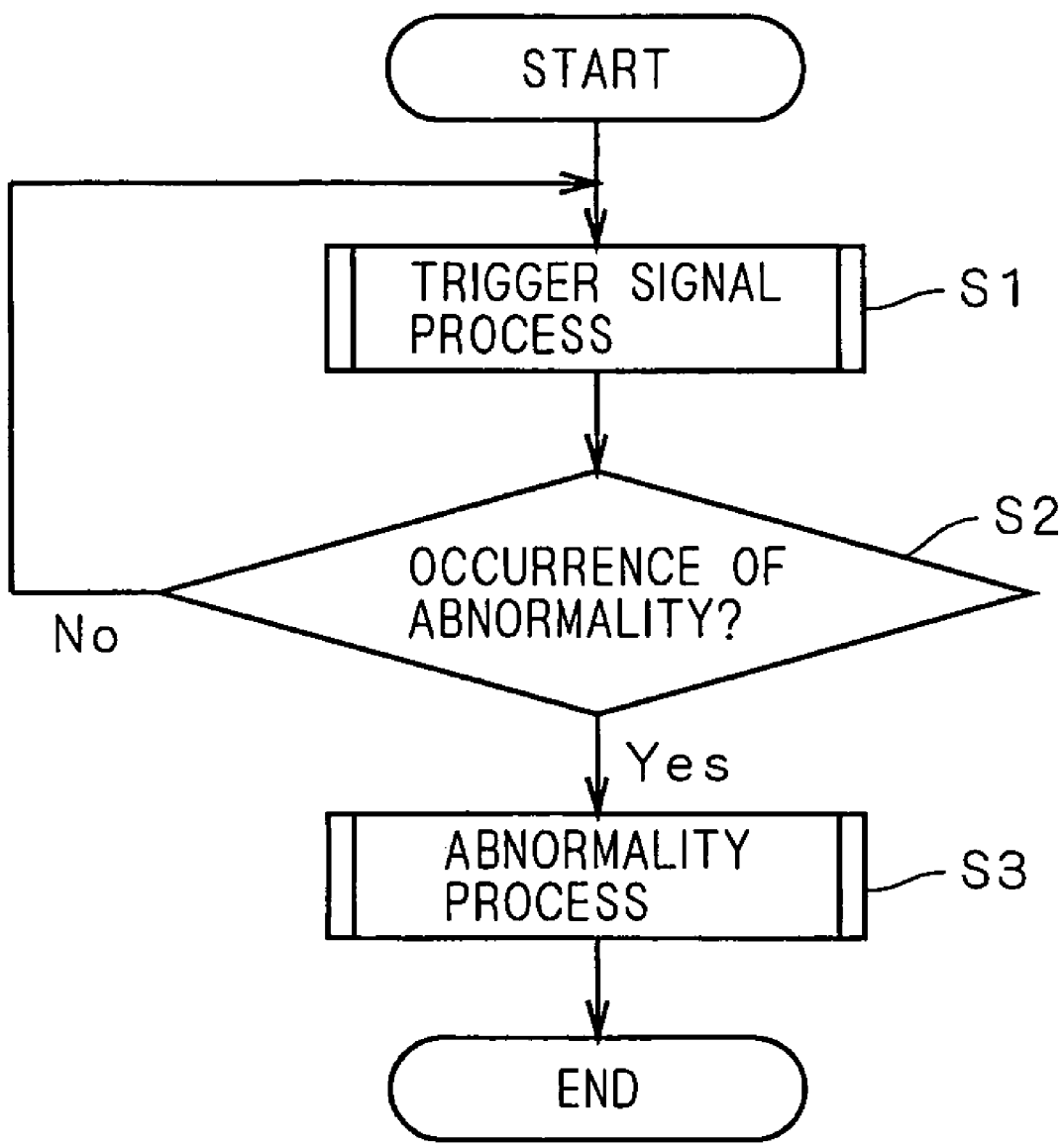
FIG. 2 is a flowchart that shows an inner operation of the monitor camera in accordance with the first preferred embodiment.
Figure 3:
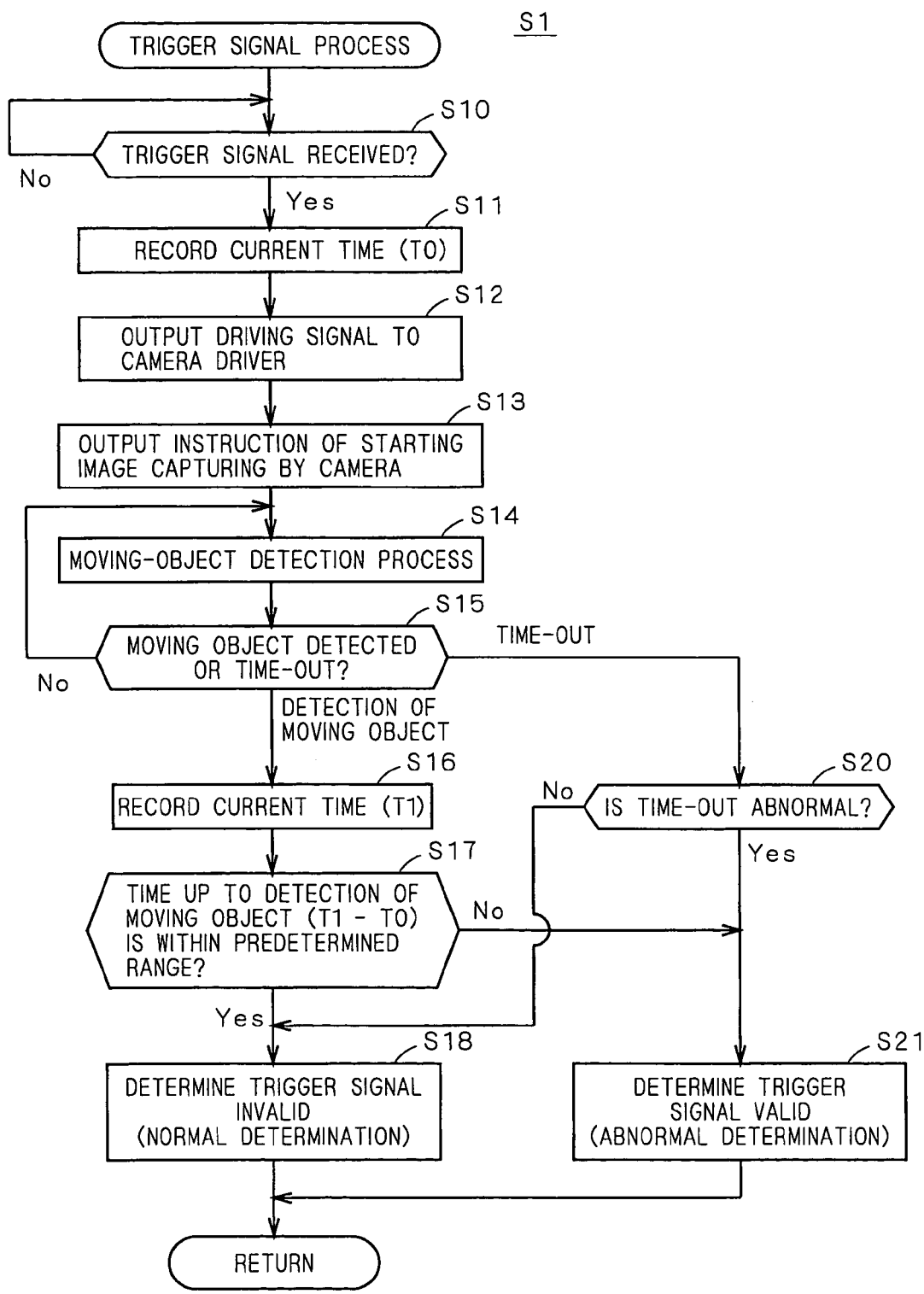
FIG. 3 is a flowchart that shows an inner operation of the monitor camera in accordance with the first preferred embodiment.
Figure 4:
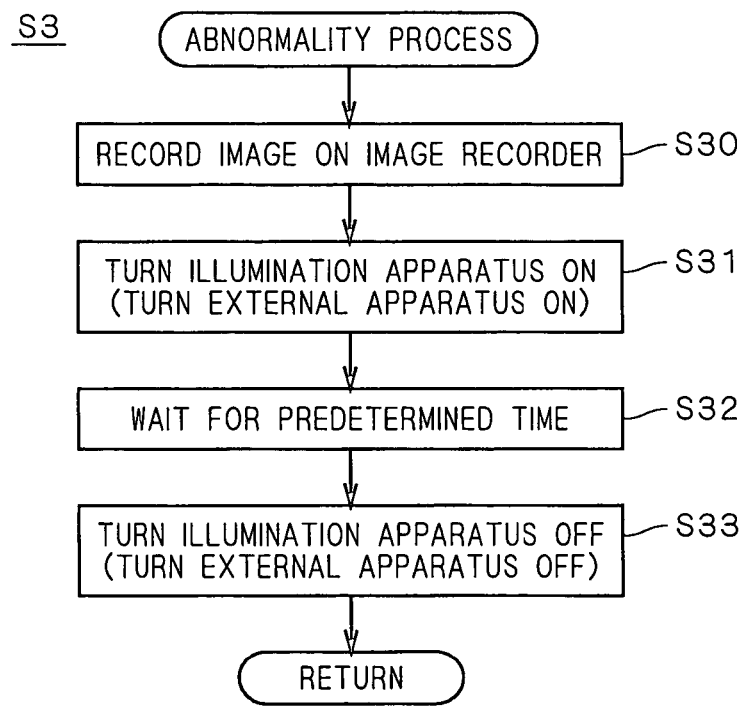
FIG. 4 is a flowchart that shows an inner operation of the monitor camera in accordance with the first preferred embodiment.

The following description will discuss the above-mentioned operations in detail. FIGS. 2 to 4 are flowcharts that show internal operations of the monitor camera 1. Herein, these flowcharts show one example of a sequence of processes that are controlled by a program to be executed by the microcomputer 22.

First, as shown in FIG. 2, a trigger signal process (step S1) is carried out in the monitor camera 1. The flowchart of FIG. 3 shows the trigger signal process (step S1) in detail.

In the stand-by state, a monitoring function for monitoring at least the input of the trigger signal is efficiently exerted in the controller 32 so that the input of the trigger signal from the detection sensor 100 is monitored (step S10). Upon receipt of the trigger signal (Yes in step S10), the controller 32 acquires a current time (T0) through the timer function, and records the time (T0) in the inner memory (step S11). Moreover, at this time, the controller 32 starts the counting operation through the timer function.

Then, the controller 32 activates the camera unit 10, and outputs a driving signal to the camera driver 13 (step S12) and also outputs an instruction of starting image capturing by a camera thereto (step S13). Consequently, the camera unit 10 sets its image capturing direction in a predetermined direction, and starts to capture continuous images that are successively updated. Then, the moving-object detector 31 starts to function to execute a moving-object detection process on the images successively obtained from the camera unit 10 (step S14). For example, the moving-object detection process is carried out each time an image of a new frame is inputted from the camera unit 10.

The controller 32 makes a determination as to whether or not the moving-object has been detected in the moving-object detector 31, and also makes a determination as to whether or not a predetermined counted value has been reached through the counting operation so as to make a determination as to time-out (step S15). Herein, when no moving-object has been detected without time-out, the moving-object detection process (step S14) are repeatedly executed. In contrast, upon receipt of the information that any moving object has been detected, the sequence proceeds to step S16, while in the case of the time-out, the sequence proceeds to step S20.

Upon receipt of the information indicating the detection of any moving object from the moving-object detector 31, the controller 32 acquires a current time (T1), and stores the time (T1) in the inner memory (step S16). Then, the signal determination unit 33 functions to determine whether or not the period of a time (T1-T0) from the input of the trigger signal by the detection sensor 100 to the detection of the moving object falls within a predetermined range (step S17).

For example, when the detection sensor 100 is attached as a door sensor so that the camera unit 10 captures images in the vicinity of a passage connecting to the door, the period of time from the opening of the door until the time at which a certain person has passed through the passage tends to fall within a predetermined range in a normal case. In contrast, in the case of a suspicious intruder, the intruder tends to walk faster than the normal walking speed or walk very slowly, with the result that the period of time from the opening of the door until the time at which the person has passed through the passage does not fall within the predetermined range in some cases.

For this reason, when the period of time (T1-T0) from the input of the trigger signal by the detection sensor 100 to the detection of the moving object falls within a predetermined range, the signal determination unit 33 determines that the trigger signal is derived from not the detection of an abnormal state, but the detection of a normal state, and recognizes the inputted trigger signal as an invalid signal (step S18). In contrast, when the period of time (T1-T0) from the input of the trigger signal by the detection sensor 100 to the detection of the moving object does not fall within a predetermined range, it determines that the trigger signal is derived from the detection of an abnormal state, and recognizes the inputted trigger signal as a valid signal (step S21).

Moreover, in the case of detection of time-out in step S15, the controller 32 determines whether or not the time-out is abnormal (step S20). The monitor camera 1 has been preliminarily set as to whether a specific time-out is regarded as normal or abnormal, and based upon the set condition, the controller 32 allows the sequence to proceed to step S18 or step S21. In other words, when the time-out is set as normal, the sequence proceeds to step S18, and when it is set as abnormal, the sequence proceeds to step S21. Then, depending on the time-out, it is determined whether the trigger signal is valid or invalid (step S18, S20). In other words, the controller 32 determines the trigger signal as a valid signal when no change is detected in images within a predetermined time from the input of the trigger signal.

In this manner, the trigger signal process (step S1 of FIG. 2) is completed. Then, the sequence returns to the flowchart of FIG. 2 where the process of the next step S2 is carried out. Herein, a determination is made as to whether or not the abnormality determination has been made in the trigger signal process (step S1). More specifically, a determination is made as to whether the trigger signal inputted from the detection sensor 100 is valid or invalid, and when the trigger signal is determined as invalid (that is, the process in step S18 has been carried out), the sequence again returns to step S1 to be set to a stand-by state for an input of the trigger signal from the detection sensor 100. In contrast, when the trigger signal is determined as valid (that is, the process in step S21 has been carried out), the sequence proceeds to step S3 where an abnormality process is carried out.

A flowchart of FIG. 4 shows the abnormality process (step S3) in detail. Upon entering the abnormality process, the controller 32 sends a recording instruction to the image recorder 26 so as to record the images stored in the buffer memory 25 and images obtained from the camera unit 10 thereafter for a predetermined time (step S30). Consequently, the image recorder 26 makes it possible to record images for a predetermined period of time from the point of time several seconds before the detection of the moving object. Thus, the image recorder 26 is allowed to record images of a suspicious intruder or the like.

Moreover, the controller 32 outputs an external-apparatus activating signal to the external-apparatus driver 24 so as to turn an external apparatus on, that is, to turn the illumination apparatus 200 on (step S31). This signal activates a switching function of the external-apparatus driver 24 to turn the illumination apparatus 200 on, thereby giving a warning to the suspicious intruder or the like.

In this case, the controller 32 waits for a predetermined time (step S32). In other words, the warning state against the intruder or the like continues for the predetermined time.

After a lapse of the predetermined time, the controller 32 stops the external-apparatus activating signal that is sent to the external-apparatus driver 24 so as to turn the illumination apparatus 200 off (step S33). Thus, the external-apparatus driver 24 turns the illumination apparatus 200 off to complete the warning state, thereby completing the entire processes.

Herein, in the flowchart of FIG. 2, after completion of the process of step S3, the sequence is preferably returned to the process of step S1 again so as to continue the monitoring operation.

Figure 5:
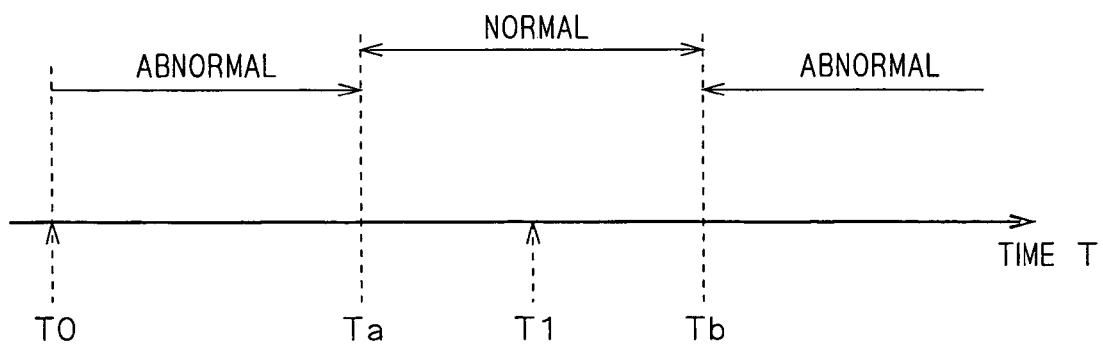
FIG. 5 is a conceptual diagram that shows a determining process as to whether a trigger signal is valid or invalid.

The above-mentioned processes are carried out so that, as shown in FIG. 5, the monitor camera 1 is allowed to determine a normal or abnormal state. In other words, when the period of time (T1-T0) from the input of the trigger signal (T0) to the detection of the moving object (T1) falls within a predetermined range (Ta to Tb), the detection sensor 100 determines this state as a normal state derived from detection of a normal object. Therefore, no abnormality process is carried out. In contrast, when the period of time (T1-T0) from the input of the trigger signal (T0) to the detection of the moving object (T1) does not fall within a predetermined range (Ta to Tb), the detection sensor 100 determines this state as an abnormal state derived from detection of an abnormal object. Therefore, the abnormality process is carried out.

In FIG. 5, the time Tb may be set as the time for time-out; however, another time for time-out may be set after the time Tb. Here, when the time Tb is set as the time for time-out, a normal state is maintained after the time Tb when the time-out is set as a normal state.

As described above, the monitor camera 1 of the present preferred embodiment is arranged so that, when no change in images is detected in the moving-object detector 31 within a predetermined time from the input of a trigger signal to the trigger signal input unit 23, the trigger signal is determined as a valid signal. Moreover, when a change in an image is detected in the moving-object detector 31 within the predetermined time from the input of a trigger signal, the trigger signal is determined as an invalid signal. Therefore, the abnormal state detected by the detection sensor 100 installed as an external-apparatus is determined as a correct detection result only when the trigger signal is determined as a valid signal, and when the trigger signal is determined as an invalid signal, it is determined as an incorrect detection result (so-called erroneous detection).

Therefore, all the detections by the detection sensor are not always determined as an abnormal state, and a determination is made as to whether or not the detection result of the detection sensor is valid or invalid, and only when it is valid, a predetermined process such as a warning process is carried out; therefore, it is possible to prevent the predetermined process for the abnormal state from being performed when the normal state is erroneously detected as the abnormal state.

In particular, only when the trigger signal is determined as valid, the image recorder 26 is allowed to record continuous images obtained from the camera unit 10 so that it is possible to prevent the storing capacity of the image recorder 26 from being shortened due to recording of normal images, and also to preferably record only images containing any abnormality.

Moreover, when the trigger signal is determined as a valid signal, a signal for activating an external apparatus is released so that appropriate treatments, such as a warning process, are carried out by the external apparatus.

2. Second Preferred Embodiment

Next, the following description will discuss the second preferred embodiment. The first preferred embodiment has discussed a case in which, when, as a result of determination as to the valid/invalid state of the trigger signal, it is determined that no abnormality is occurring, no process is particularly carried out. In contrast, the present preferred embodiment discusses a case where when, as a result of determination as to the valid/invalid state of the trigger signal, it is determined that no abnormality is occurring (that is, when the corresponding state is determined as normal), a process different from the abnormality process is carried out.

Figure 6:
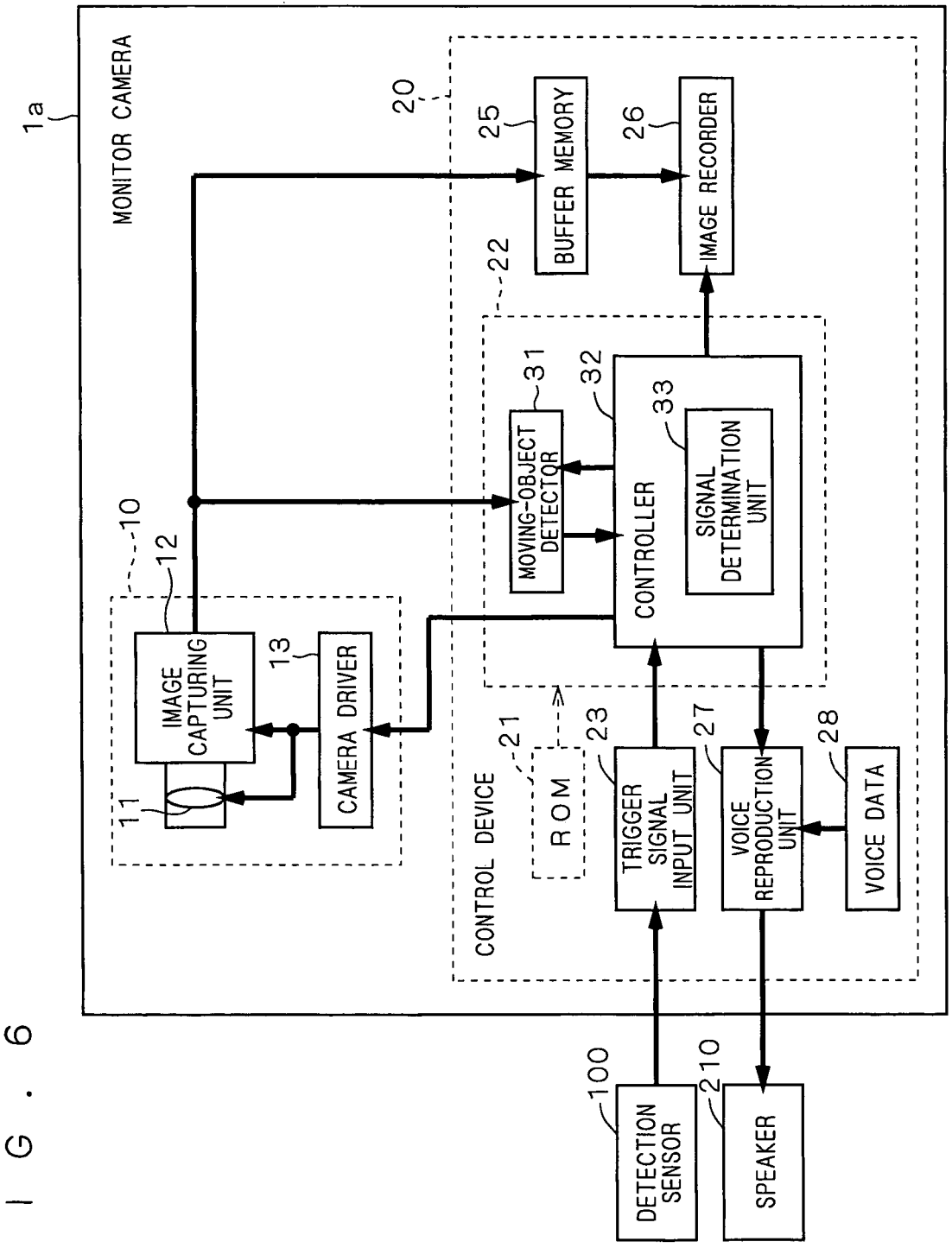
FIG. 6 shows a structure of a monitor camera in accordance with a second preferred embodiment.

FIG. 6 shows a structure of a monitor camera 1a in accordance with the second preferred embodiment. In FIG. 6, those members having the same functions as those shown in the first preferred embodiment are indicated by the same reference numerals, and the description thereof will not be repeated.

The points in which the monitor camera 1a of the present preferred embodiment is different from the monitor camera 1 of the first preferred embodiment are that a speaker 210 is connected to the monitor camera 1a as an external apparatus, and that the control device 20 of the monitor camera 1a is provided with a voice reproduction unit 27 connected to the speaker 210 and a memory 28 that stores voice data.

For example, two kinds of voice data are preliminarily stored in the memory 28. One kind of the data is voice data to be generated upon occurrence of any abnormality, and, for example, warning voice data, for example, saying "No admittance here", is stored therein. The other kind of the data is voice data that is used in the normal state, that is, welcome-use voice data, for example, saying "Welcome" is stored therein. Here, the voice data to be stored in the memory 28 are not limited to two kinds, and more kinds of data may be stored.

When, after receiving a trigger signal from the detection sensor 100, it is determined that the trigger signal is valid, the monitor camera 1a of the present preferred embodiment allows the image recorder 26 to record continuous images based upon an instruction from the controller 32, and also allows the voice reproduction unit 27 to acquire voice data to be used at the time of abnormality from the memory 28 and reproduce it to give voice signals to the speaker 210. Thus, in the present preferred embodiment, at the time of occurrence of any abnormality, a voice warning process is carried out together with an image recording process.

Moreover, when, after receiving a trigger signal from the detection sensor 100, it is determined that the trigger signal is invalid, based upon an instruction from the controller 32, the voice reproduction unit 27 is allowed to acquire voice data to be used in the normal state from the memory 28 and reproduce it to give voice signals to the speaker 210. Thus, in the present preferred embodiment, in the normal state, voice information different from that at the time of occurrence of any abnormality is given.

Figure 7:
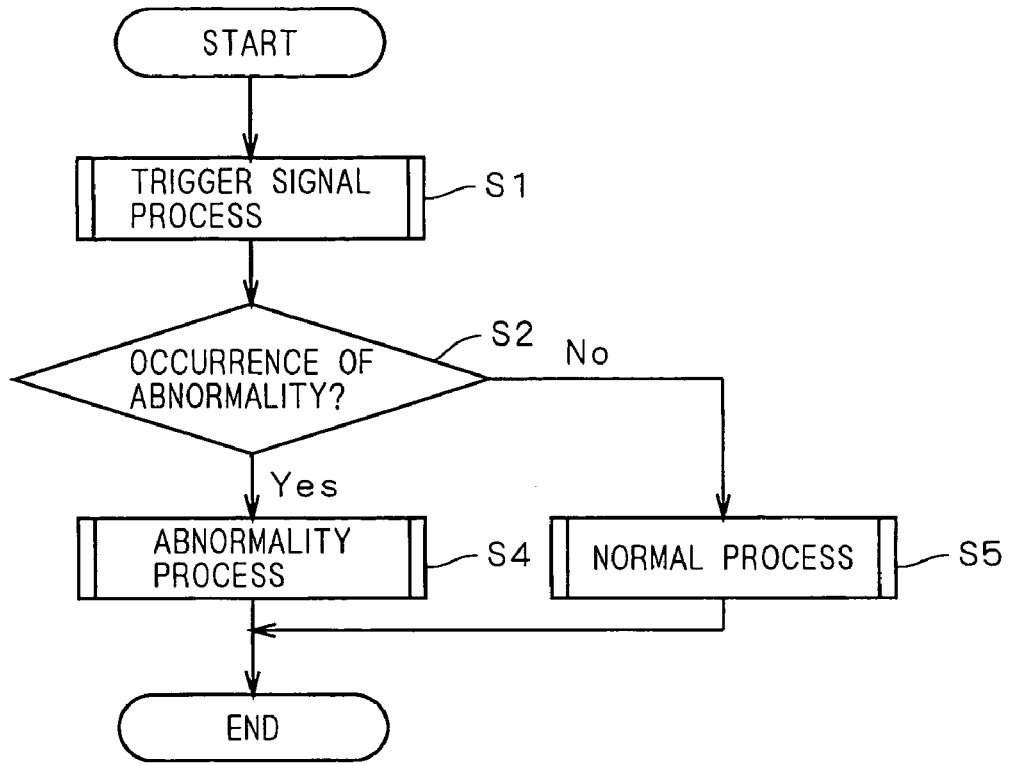
FIG. 7 is a flowchart that shows an inner operation of the monitor camera in accordance with the second preferred embodiment.
Figure 8:
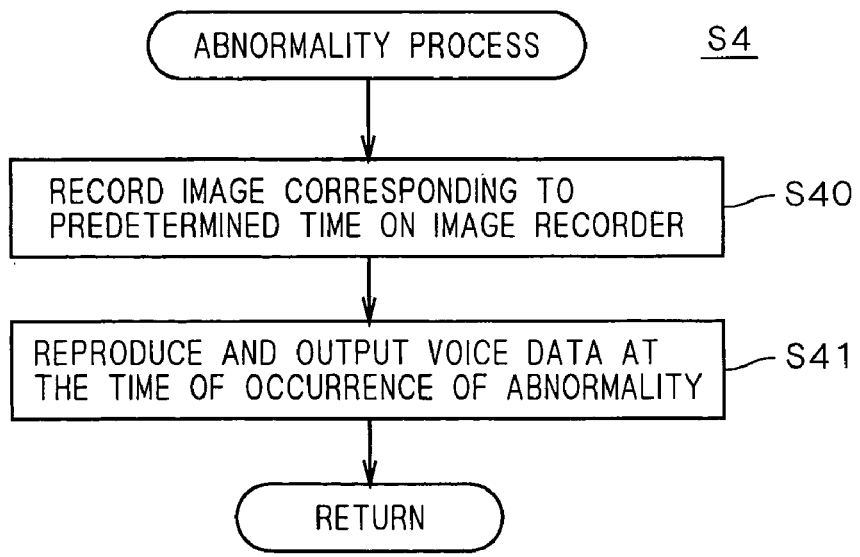
FIG. 8 is a flowchart that shows an inner operation of the monitor camera in accordance with the second preferred embodiment.
Figure 9:
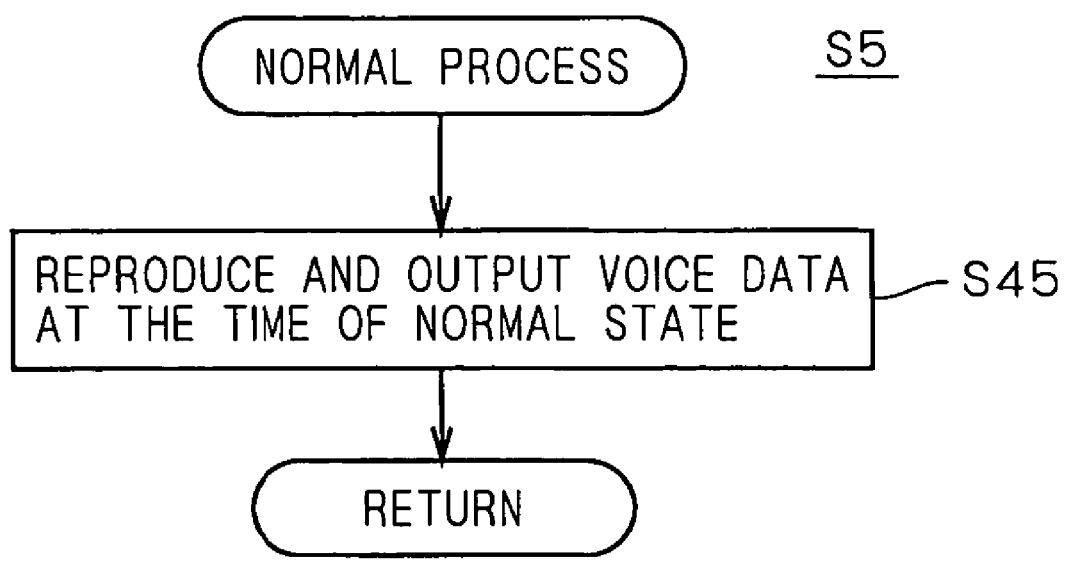
FIG. 9 is a flowchart that shows an inner operation of the monitor camera in accordance with the second preferred embodiment.

The following description will discuss operations of the present preferred embodiment in detail. FIGS. 7 to 9 are flowcharts that show internal operations of a monitor camera 1a. Herein, these flowcharts also show one example of a sequence of processes that are controlled by the program to be executed by the microcomputer 22.

First, as shown in FIG. 7, a trigger signal process (step S1) is carried out in the monitor camera 1a. The trigger signal process (step S1) is the same process as step S1 of FIG. 2, and the flowchart of FIG. 3 shows the process in detail.

Upon completion of the trigger signal process (step S1 of FIG. 7), the process of step S2 is next carried out. The determining process as to whether or not a determination indicating an abnormal state has been made in step S2 are the same as the process described in the first preferred embodiment. Then, in the case of the determination of an abnormal state, the sequence proceeds to step S4, and in contrast, in the case of the determination of a normal state, the sequence proceeds to step S5.

A flowchart of FIG. 8 shows the abnormality process (step S4) in detail. Upon entering the abnormality process, the controller 32 sends a recording instruction to the image recorder 26 so as to record the images stored in the buffer memory 25 and images obtained from the camera unit 10 thereafter for a predetermined time (step S40). Consequently, the image recorder 26 makes it possible to record images for a predetermined period of time from the point of time several seconds before the detection of the moving object. Thus, the image recorder 26 is allowed to record images of a suspicious intruder or the like.

Moreover, the controller 32 outputs an instruction for reproducing voice data to be used at the time of occurrence of any abnormality to the voice reproduction unit 27 (step S41). Thus, the voice reproduction unit 27 acquires voice data to be used at the time of occurrence of any abnormality from the memory 28, and reproduces the data to generate a warning voice or the like from the speaker 210.

A flowchart of FIG. 9 shows a normal process (step S5) in detail. Upon entering the normal process, the controller 32 sends an instruction for reproducing voice data to be used in the normal state to the voice reproduction unit 27 (step S45). Thus, the voice reproduction unit 27 acquires voice data to be used in the normal state from the memory 28, and reproduces it to generate a welcoming voice or the like from the speaker 210.

Herein, in the flowchart of FIG. 7, after completion of the process in steps S4 and S5, the sequence is preferably returned to the process of step S1 again so as to continue the monitoring operation.

As described above, the monitor camera 1a in the present preferred embodiment has an arrangement in which, when the trigger signal, inputted from the detection sensor 100, is not determined as a valid signal, a process different from the case where it is determined as a valid signal is carried out; therefore, it is possible not only to give a warning to a suspicious intruder or the like, but also to carry out necessary processes on a normal passenger or the like. For example, when a structure including the monitor camera 1a is attached to a shop or the like, it is possible to give a warning voice to a suspicious intruder, and also to give a welcoming voice to normal customers and the like.

Moreover, although not shown in FIG. 6, when a determination indicating a normal state has been made (when the trigger signal is determined as an invalid signal), a guiding light for guiding a normal visitor or the like through the passage may be turned on. In this case, when a determination indicating an abnormal state has been made, the guiding light is not turned on.

3. Third Preferred Embodiment

Next, the following description will discuss the third preferred embodiment. This preferred embodiment exemplifies a case where, upon occurrence of any abnormality, information indicating the occurrence of the abnormal state is transmitted to predetermined user terminals through a network such as the Internet and the public telephone line network.

Figure 10:
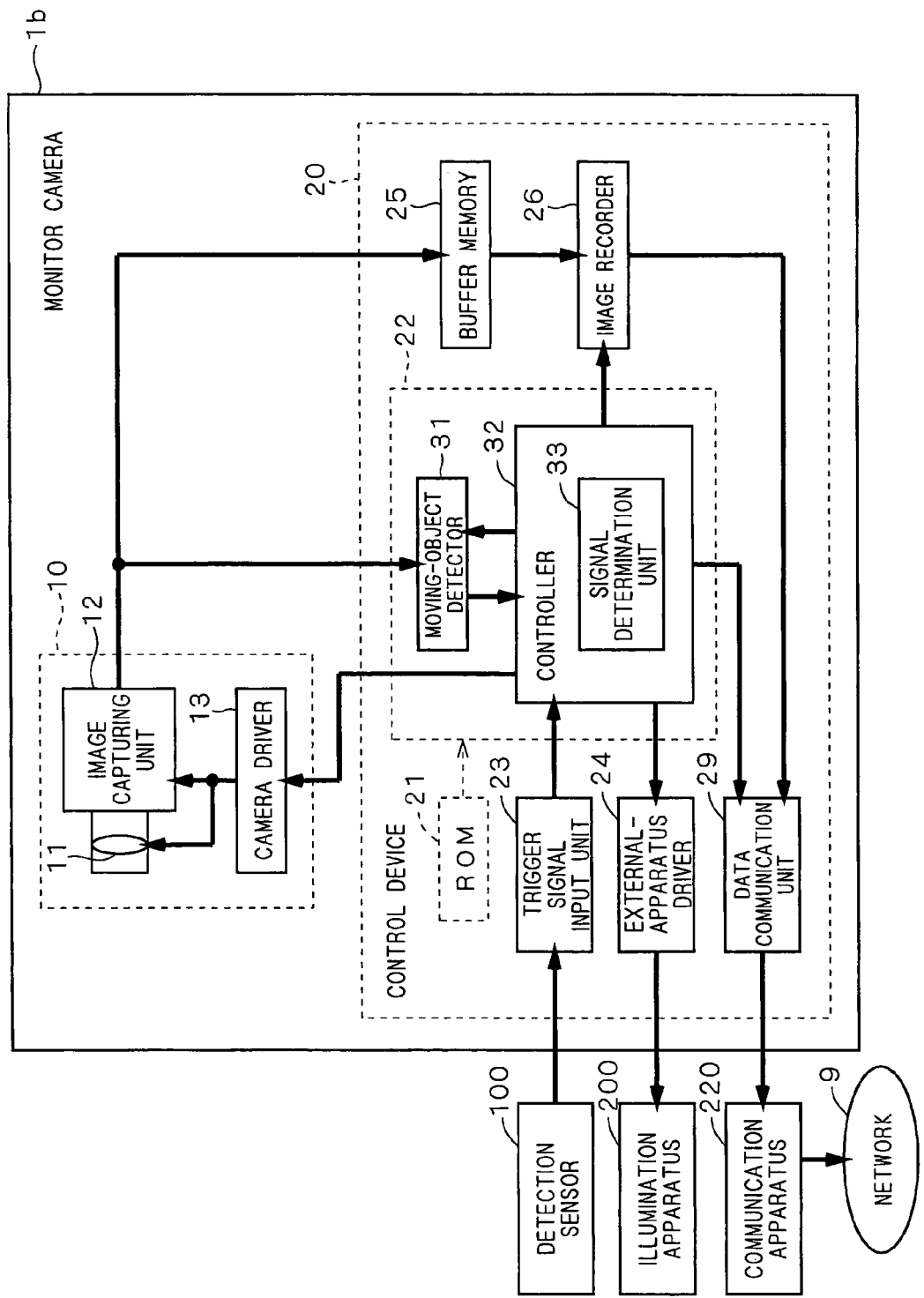
FIG. 10 is a shows a structure of a monitor camera in accordance with a third preferred embodiment.

FIG. 10 shows a structure of a monitor camera 1b in accordance with the third preferred embodiment. In FIG. 10, those members having the same functions as those shown in the first preferred embodiment are indicated by the same reference numerals, and the description thereof will not be repeated.

The points in which the monitor camera 1b of the present preferred embodiment is different from the monitor camera 1 of the first preferred embodiment are that communication apparatuses 220 such as a modem and a router which communicate with user terminals through the network 9 are connected to the monitor camera 1b as external apparatuses, and that a data communication unit 29 which carries out data communication with user terminals by transmitting and receiving data to and from the communication apparatus 220 is installed in the control device 20 of the monitor camera 1b.

When, after receiving a trigger signal from the detection sensor 100, it is determined that the trigger signal is valid, the monitor camera 1b of the present preferred embodiment allows the image recorder 26 to record continuous images based upon an instruction from the controller 32, and also turns the illumination apparatus 200 on to illuminate the monitoring area or the peripheral portion thereof to give a warning. In addition to these, the data communication unit 29 acquires the recorded images having captured images of an intruder or the like from the image recorder 26, and sends an electronic mail to which the recorded images are added to addresses specified by the controller 32.

Figure 11:
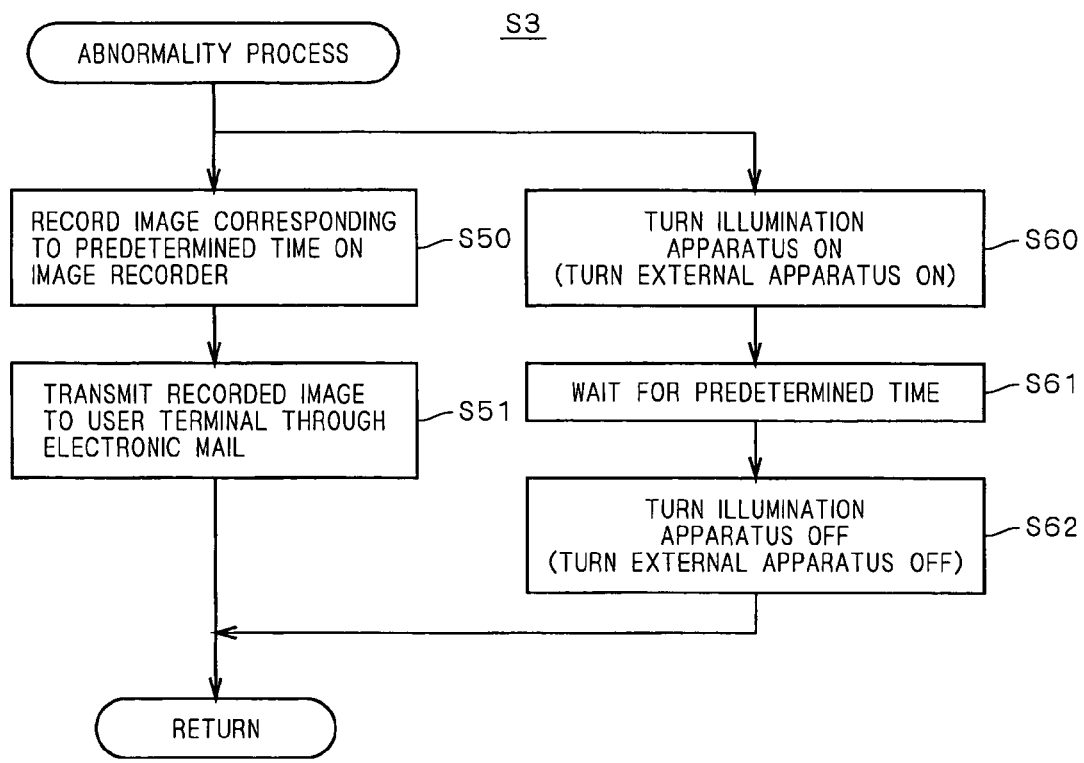
FIG. 11 is a flowchart that shows an abnormality process in accordance with the third preferred embodiment.

The following description will discuss an operation of the present preferred embodiment in detail. Based upon flowcharts shown in FIGS. 2 and 3, an internal operation of the monitor camera 1b is carried out. In other words, in the present preferred embodiment also, in the same manner as the first preferred embodiment, a determination is made as to whether the trigger signal inputted from the detection sensor 100 is valid or invalid, and based upon the result of the determination, a determination is made as to whether the current state is normal or abnormal. In the case of the determination of the abnormal state, the abnormality process (step S3 in FIG. 2) is carried out. In the present preferred embodiment, a flowchart as shown in FIG. 11 is used as the abnormality process in step S3 in FIG. 2. The following description will be given based upon the flowchart of FIG. 11.

In the present preferred embodiment, upon entering the abnormality process, the controller 32 carries out a parallel process. More specifically, a first process including steps S50 and S51, shown in FIG. 11, and a second process including steps S60, S61 and S62 are executed in parallel with each other.

In the first process, the controller 32 first sends a recording instruction to the image recorder 26 so as to record the images stored in the buffer memory 25 and images obtained from the camera unit 10 thereafter for a predetermined time (step S50). Consequently, the image recorder 26 makes it possible to record images for a predetermined period of time from the point of time several seconds before the detection of the moving object.

Then, the controller 32 sends a data transmission instruction to the data communication unit 29 by designating preset addresses (step S51). Thus, the data communication unit 29 is allowed to acquire the images corresponding to the predetermined time stored in the image recorder 26, and forms an electronic mail having designated addresses with the images attached thereto, for example, in an attached file format. The data communication unit 29 outputs the electronic mail thus formed to the communication apparatus 220 so as to transmit the electronic mail to, for example, a user terminal carried by the user who is out, through the network 9.

In the second process, on the other hand, the controller 32 sends an external-apparatus activating signal to the external-apparatus driver 24 so as to turn the illumination apparatus 200 on (step S60). Thus, the external-apparatus driver 24 activates its switching function to turn the illumination apparatus 200 on, thereby giving a warning to a suspicious intruder or the like.

In this state, the controller 32 waits for a predetermined time (step S61). In other words, the warning state against the intruder or the like continues for a predetermined time.

After a lapse of the predetermined time, the controller 32 stops the external-apparatus activating signal that is sent to the external-apparatus driver 24 so as to turn the illumination apparatus 200 off (step S62). Thus, the external-apparatus driver 24 turns the illumination apparatus 200 off to complete the warning state.

In this manner, the abnormality process (step S3) of the present preferred embodiment is carried out. FIG. 11 has exemplified a case in which the electronic mail is used for communicating means with user terminals; however, the present invention is not limited by this means. For example, facsimile communication may be used, or any other communication means may be used as long as it can inform the user at a remote place of occurrence of any abnormality.

As described above, in the monitor camera 1b of the present preferred embodiment, when no moving object is detected in input images from the camera unit 10 within a predetermined time from the input of a trigger signal by the detection sensor 100, the trigger signal is determined as a valid signal, and this fact is transmitted to an external apparatus (user terminal) through the data communication unit 29. For this reason, it is possible to readily recognize occurrence of any abnormality in the monitoring area even from a remote area.

Moreover, in the case of an arrangement in which the trigger signal generated by the detection sensor 100 is always determined as an abnormal state, as in the case of the conventional arrangement, a great amount of abnormality information, such as electronic mails and the like, including erroneous detections, is transmitted to user terminals; however, in the present preferred embodiment, upon receipt of a trigger signal from the detection sensor 100, it is first determined whether the trigger signal is valid or invalid. The resulting advantage is that it is possible to prevent abnormality information derived from an erroneous detection from being transmitted.

Moreover, in the control device 20 of the present preferred embodiment, the process for giving abnormality information to the user terminals (first process) and the process for giving a warning to the intruder or the like (second process) are carried out in parallel with each other; therefore, even when there is any error in one of the processes, the other process is not subjected to the influences from the error. For example, when the first process and the second process are carried out sequentially, if there is any failure in the transmitting process of abnormality information by the use of an electronic mail, the illumination apparatus 200 might not be turned on to fail to give a warning to the intruder or the like; however, the parallel processes of the present preferred embodiment make it possible to always give a warning to the intruder or the like, independent of the success or failure in the electronic mail transmission.

4. Modifications

The foregoing description has discussed preferred embodiments of the present invention; however, the present invention is not intended to be limited by these preferred embodiments.

Herein, the above description has exemplified a case where the camera unit 10 and the control device 20 are integrally formed in each of the monitor cameras 1, 1a and 1b. However, the present invention is not intended to be limited by this arrangement, and the camera unit 10 and the control device 20 may be formed as independent devices. In this case, the processes of the above-mentioned flowcharts are carried out by the control device 20.

Moreover, a door sensor is exemplified as the detection sensor 100; however, the detection sensor 100 is not intended to be limited by the door sensor, and other sensors may be used. For example, sensors, such as a mat sensor, an infrared sensor and a far infrared sensor, may be used.

Furthermore, the above description has exemplified a case where an illumination apparatus and a speaker are used as external apparatuses for giving warnings to an intruder or the like; however, any warning-use external apparatus except for these may be used.

While the invention has been shown and described in detail, the foregoing description is in all aspects illustrative and not restrictive. It is therefore understood that numerous modifications and variations can be devised without departing from the scope of the invention.

What is claimed is:

1. A control device for carrying out a predetermined process in response to a trigger signal from a sensor, comprising:
   a signal input unit connected to the sensor and configured to receive a trigger signal;
   a detector connected to an image capturing unit and configured to receive continuous images from the image capturing unit, said detector being configured to analyze images obtained from said image capturing unit for at least a period of time beginning at a time of a trigger signal and ending a predetermined amount of time after the trigger signal, said detector being configured to determine whether or not a change occurs in such images during said period of time;
   a determining unit which determines whether or not a trigger signal is a valid signal, said determining unit being configured to determine, based on analysis by said detector, that the trigger signal is valid in the case that said detector does not detect a change in the images during said period of time; and
   a controller, responsive to said determining unit, which is configured to carry out a predetermined process in the case that said determining unit determines that a trigger signal is a valid signal.

2. The control device according to claim 1, wherein said sensor detects an intruding object in a predetermined monitoring area in which images are captured by said image capturing unit.

3. The control device according to claim 1, wherein said detector detects whether or not any moving object exists in each of the images in an image stream that continues in time series, which are obtained from said image capturing unit.

4. The control device according to claim 1, wherein said controller carries out different processes between a case where said trigger signal is not determined as a valid signal by said determining unit and that where said trigger signal is determined as a valid signal by said determining unit.

5. The control device according to claim 1, further comprising:
   a recorder recording continuous images obtained from said image capturing unit, wherein
   said controller controls said recorder so as to record the continuous images obtained from said image capturing unit, when said determining unit determines said trigger signal as a valid signal.

6. The control device according to claim 1, wherein when said trigger signal is determined as a valid signal by said determining unit, said controller outputs a signal used for activating an external apparatus connected to the control device.

7. The control device according to claim 1, further comprising:
   a sound-data storage unit storing sound data, wherein when said trigger signal is determined as a valid signal by said determining unit, said controller generates sound based upon sound data stored in said sound-data storage unit.

8. The control device according to claim 1, further comprising:
a communication unit carrying out data communications with an external apparatus, wherein
when said trigger signal is determined as a valid signal by said determining unit, said controller allows said communication unit to output information indicating the result of determination to said external apparatus.

9. The control device according to claim 1, wherein said detector is further configured to activate an image capturing unit from a stand-by state to start image capturing in response to a trigger signal.

10. A control method of carrying out a predetermined process in response to a trigger signal from a sensor, comprising the steps of:
receiving a trigger signal from the sensor;
receiving continuous images from an image capturing unit;
detecting a change in the images by analyzing the images for at least a period of time beginning at a time of a trigger signal and ending a predetermined amount of time after the trigger signal;
determining with an electronic computing device, based on analysis by said detecting step, that a trigger signal is a valid signal in the case that said detecting step does not detect a change in the images during said period of time; and
carrying out a predetermined process, in response to said determining step determining that a trigger signal a valid signal.

11. The control method according to claim 10, wherein said change in the images is detected by determining whether or not any moving object exists in each of the images in an image stream that continues in time series.

12. The control method according to claim 10, wherein:
said predetermined process includes a process to record the images.

13. A control device for carrying out a predetermined process in response to a trigger signal, comprising:
a signal input unit configured to receive a trigger signal;
a detector configured to receive continuous images from an image capturing unit and to detect a change in the images by analyzing the images obtained from said image capturing unit, said detector being further configured to analyze the images during a first time period commencing at the time of a trigger signal and ending a first predetermined amount of time after the trigger signal, said detector being further configured to analyze the images during a second time period commencing at the end of the first time period and ending a second predetermined amount of time after the first time period, and said detector being further configured to analyze the images during a third time period commencing at the end of the second time period;
a determining unit which determines whether or not a trigger signal is a valid signal based on analysis by said detector, said determining unit being configured to determine that the trigger signal is an invalid signal in the case that said detector detects a change in the images during the second time period, and said determining unit being further configured to determine that the trigger signal is a valid signal in the case that said detector detects a change in images during one of the first and third time periods; and
a controller, responsive to said determining unit, which is configured to carry out a predetermined process in the case that said determining unit determines that a trigger signal is a valid signal.

14. The control device according to claim 13, wherein said signal input unit is connected to a sensor which generates said trigger signal.

15. The control device according to claim 14, wherein said sensor unit detects an intruding object in a predetermined monitoring area from which the continuous images are captured by said image capturing unit.

16. The control device according to claim 13, wherein said detector detects whether or not any moving object exists in each of the continuous images in an image stream that continues in time series.

17. The control device according to claim 13, wherein said controller carries out different processes between a case where said trigger signal is determined as an invalid signal by said determining unit and that where said trigger signal is determined as a valid signal by said determining unit.

18. The control device according to claim 13, further comprising:
a recorder recording the continuous images obtained from said image capturing unit, wherein
said controller controls said recorder so as to record the continuous images obtained from said image capturing unit when said determining unit determines said trigger signal as a valid signal.

19. The control device according to claim 13, wherein when said trigger signal is determined as a valid signal by said determining unit, said controller outputs a signal used for activating an external apparatus connected to the control device.

20. The control device according to claim 13, further comprising:
a sound-data storage unit storing sound data, wherein
when said trigger signal is determined as a valid signal by said determining unit, said controller generates sound based upon sound data stored in said sound-data storage unit.

21. The control device according to claim 13, further comprising:
a communication unit carrying out data communications with an external apparatus, wherein
when said trigger signal is determined as a valid signal by said determining unit, said controller allows said communication unit to output information indicating the result of determination to said external apparatus.

22. The control device according to claim 13, wherein said detector is further configured to activate an image capturing unit from a stand-by state to start image capturing in response to a trigger signal.

23. A computer readable medium encoded with a program which can be run by a computer to which a trigger signal and continuous images are inputted, said program causing the computer to implement a method comprising the steps of:
receiving a trigger signal;
receiving said continuous images;
detecting a change in the continuous images by analyzing the continuous images that are received after the input of the trigger signal, said detecting step further analyzing the images during a first time period commencing at the time of a trigger signal and ending a first predetermined amount of time after the trigger signal, said detecting step further analyzing the images during a second time period commencing at the end of the first time period and ending a second predetermined amount of time after the first time period, and said detecting step further analyzing the images during a third time period commencing at the end of the second time period;

determining, based on analysis by the detecting step, that a trigger signal is an invalid signal in the case that said detecting step detects a change in images during the second time period, and determining, based on analysis by the detecting step, that a trigger signal is a valid signal in the case that said detecting step detects a change in images during one of the first and third time periods; and carrying out, in response to said determining step, a predetermined process in the case that said trigger signal is determined to be a valid signal.

24. A control method of carrying out a predetermined process in response to a trigger signal, comprising the steps of:

receiving a trigger signal;

receiving continuous images from an image capturing unit;

detecting a change in the images by analyzing the images, said detecting step further analyzing the images during a first time period commencing at the time of a trigger signal and ending a first predetermined amount of time after the trigger signal, said detecting step further analyzing the images during a second time period commencing at the end of the first time period and ending a second predetermined amount of time after the first time period, and said detecting step further analyzing the images during a third time period commencing at the end of the second time period;

determining with an electronic computer device, based on an analysis by said detecting step, that a trigger signal is an invalid signal in the case that a change in the images is detected during the second time period, and determining with an electronic computer device, based on an analysis by said detecting step, that a trigger signal is a valid signal in a case that a change in images is detected during one of the first and third time periods; and carrying out a predetermined process when said trigger signal is determined as a valid signal.

25. The control method according to claim 24, wherein said change in images is detected by determining whether or not any moving object exists in each of the images in an image stream that continues in time series.

26. The control method according to claim 24, wherein; said predetermined process includes a process to record the continuous images.

27. A control device for carrying out a predetermined process in response to a trigger signal from a sensor, comprising:

a signal input unit connected to a sensor and configured to receive a trigger signal;

a detector connected to an image capturing unit and configured to receive continuous images and detect a change in the images by analyzing the images obtained from the image capturing unit for at least a period of time beginning at a time of a trigger signal and ending a predetermined amount of time after the trigger signal;

a determining unit configured to determine whether or not a trigger signal is a valid signal, said determining unit configured to determine, based on analysis by said detector, that the trigger signal is a valid signal in the case that said detector detects no change in images that are received in said period of time; and a controller, responsive to said determining unit, which is configured to carry out a predetermined process in the case that the trigger signal is determined to be a valid signal.

28. A control device for carrying out a predetermined process in response to a trigger signal from a sensor, comprising:

a signal input unit connected to a sensor and configured to receive a trigger signal;

a detector connected to an image capturing unit and configured to receive continuous images and detect a change in the images by analyzing the images obtained from the image capturing unit, said detector being further configured to analyze the images during a first time period commencing at the time of a trigger signal and ending a first predetermined amount of time after the trigger signal, said detector being further configured to analyze the images during a second time period commencing at the end of the first time period and ending a second predetermined amount of time after the first time period, and said detector being further configured to analyze the images during a third time period commencing at the end of the second time period;

a determining unit configured to determine, based on analysis by said detector, whether a trigger signal is a valid signal, said determining unit determining that the trigger signal is an invalid signal in the case that said detector detects a change in images during the second time period, and said determining unit configured to determine that the trigger signal is a valid signal in the case that said detector detects a change in images during one of the first and third time periods; and a controller, responsive to said determining unit, which is configured to carry out a predetermined process in the case that said determining unit determines that a trigger signal is a valid signal.

* * * * *